March 12, 1957  L. H. BARRON  2,784,536
DIAMOND BAND SAW
Filed Oct. 3, 1955
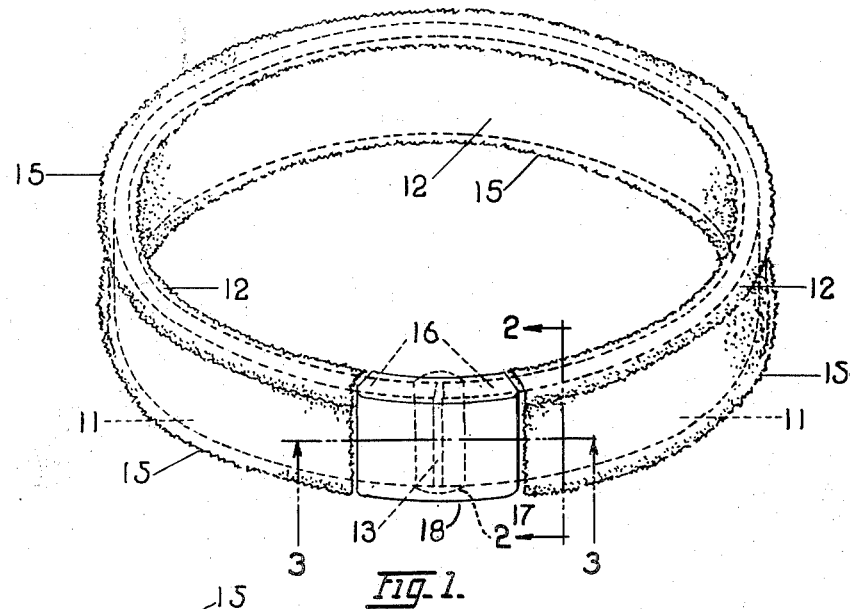
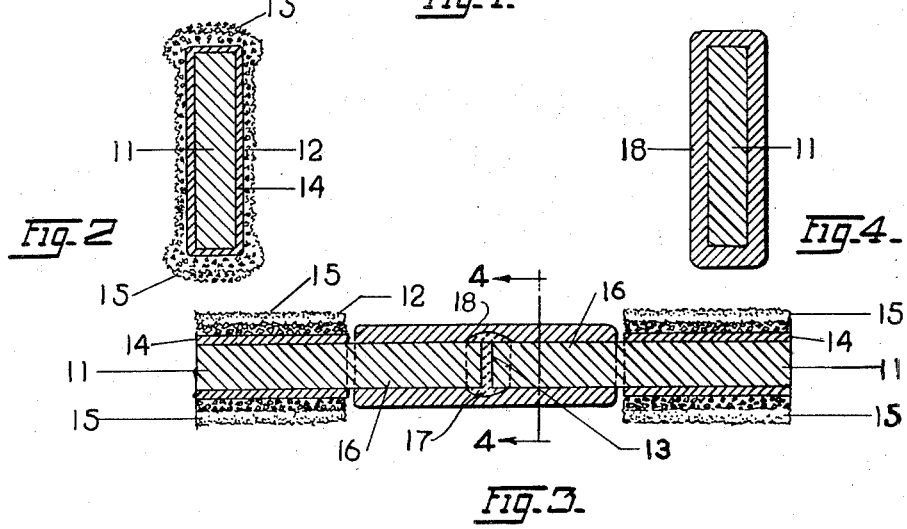
LEE H. BARRON,
INVENTOR.
BY
ATTORNEY.

2,784,536
DIAMOND BAND SAW
Lee H. Barron, Glendale, Calif.

Application October 3, 1955, Serial No. 538,052

8 Claims. (Cl. 51—188)

This invention relates to an improved diamond coated steel band saw and to the method of making the same.

The principal object of this invention is to provide an improved diamond coated metal band saw which makes a clean cut in any direction in which the object to be cut is fed into the saw and which does not in use bind in the kerf nor become hot. Another object is to provide a band saw coated with diamond grit in which the welded joint is strong enough to hold the band together under operating conditions and does not cause pounding or vibration as it passes over or through the piece being cut.

Metal working tools including grinding wheels which have diamond grits embedded on the grinding or cutting surfaces are well known, but heretofore no one has produced a diamond band saw with diamond grits coated on the cutting edges which would cut satisfactorily without the frequent binding of the saw in the kerf, with subsequent heating and too rapid destruction of the diamond cutting surface. In the prior art only the forward edges into which the material is advanced have been coated with diamonds, and the sides of the band have been plain and uncoated. The contact of the plain metal sides of such a band against the kerf surfaces resulted in much friction and frictional heat. In addition, the welded joint of the continuous band has been a common source of trouble and failure of diamond coated band saws. Following the practice in steel saws, the excess metal formed at the abutting ends is removed by grinding to give a smooth surface finish at the joint, this being thought necessary to reduce friction and bumping.

These defects have been overcome by the structure and method of producing my improved diamond coated band saw, which will be understood from the following description, reference being made to the accompanying drawings in which:

Fig. 1 is a perspective view of a narrow steel band coated on all surfaces and edges with diamond grit;

Fig. 2 is a cross-sectional view taken on the line 2—2 of Fig. 1;

Fig. 3 is an enlarged fragmentary longitudinal sectional view taken on the line 3—3 of Fig. 1; and Fig. 4 is a cross-sectional view taken on the line 4—4 of Fig. 3.

Referring to the drawings, Fig. 1 shows in perspective a steel or other metal band 11 coated on its entire surface with diamond grits 12, except at the joint 13. The band may, of course, be of any desired length and other dimensions, and as is customary in the art, the band may be formed by butt welding to form joint 13, so that a continuous band results. In my process I prefer to coat the strip with the diamond grits prior to welding it into a band or ring. The coating of diamond grit on metal grinding or cutting surfaces has long been practiced, and generally consists in electroplating a metallic coating over and around the diamond grit distributed on the surface, the diamonds being partly embedded in the electroplated coating. I follow this procedure in a general way, but vary it in accordance with my invention which provides an improved band saw. For example, a flat steel strip 11 approximately ⅛ inch wide and .020 inch in thickness is first cleaned chemically by treating it in a sulfuric acid electrolytic bath with the steel strip as the anode. After cleaning, the steel strip is stretched out flat on a smooth non-conductive support in an elongated electroplating bath containing a plating liquid such as "Watts" solution, for example, consisting of 10 pounds of nickel sulfate, 1 pound 14½ ounces of nickel chloride and 1 pound 4 ounces of boric acid dissolved in 5 gallons of distilled water. The steel strip 11 is first given an initial electroplated coating 14 of about .002 inch of nickel. While still in the plating solution and without interrupting the current flow, selected and graded diamond grits are then distributed evenly on the supper surface of the band and extending over the edge of the band and on the supporting surface. A coating of pure nickel is then electroplated on the band, embedding and more or less enveloping the diamond grits thereon, this coating being from about .002 inch to .010 inch in thickness, depending upon the grit sizes and other factors. This operation requires from 8 to 10 hours with a low current density. The unattached diamond grits are removed, the steel band is turned over to expose the uncoated surface, supported upon the non-conductive platform in the plating bath, and, with the current still flowing, is again covered with loose diamond grits evenly distributed over the surface and also over the edges. A thin coating of from .002 inch to .010 inch of nickel is again electrically deposited on the band embedding and enveloping the diamond grits. In this way the edges and the contiguous areas of the flat faces of the steel strip are twice coated, so that in cross-section the coating appears as shown in Fig. 2 with the coating on the narrow edges being enlarged and of at least fifty percent greater thickness than the coated band in its mid-surface, forming thickened grinding edge coatings 15.

In the electroplating process above described, the end portions of the band for a short length of ⅛ inch to ¼ inch are protected against electroplating by a non-conductive coating, or by the connecting clamps which carry the electric current to the band. These bare ends 16, after the coating is completed, are then resistance-welded together to form the butt joint 13. The bead 17 of excess metal at the joint is preferably not removed, and the bare rough welded joint 13 is then covered with brazing metal compound and a brazed joint or coating 18 is formed over the welded joint by means of a torch, following the usual brazing practice. The brazing material may be a copper alloy. The brazed filler 18 is built up to approximately the same thickness as the adjacent diamond grit coating. This composite structure not only greatly strengthens the joint, but also prevents the bump or vibration which results when the uncoated joint section of a band saw passes through the kerf. With the space filled in by the brazing material, the coated band runs smoothly, and therefore can be more easily controlled in cutting or finishing the work. The freedom from bumping and vibration also reduces the mechanical strains and stresses in the band, and greatly increases its useful life.

Forming the enlarged coated edges of the band as above described, that is by double coating the diamond grit on the narrow cutting edges, not only gives double life to the thin cutting edges, but also provides a band saw which cuts a kerf slightly wider than the middle portion of the band, thus eliminating all possibilities of drag or binding of the saw in the kerf. The diamond coating on all surfaces of the saw blade also eliminates the binding due to any side thrust against the band during its use, because the sides or flat surfaces of the saw cut equally well and therefore do not bind, but cut away any material which tends to bind. The side of the saw also may be used for a cutting surface if desired, although this is not the general practice, except that the sides may cut to some extent when the saw is making short radius curved cuts.

In the finished band including the coating as above described, given for illustrative purposes only and are not for limitation, the total band thickness including both coatings is about .060 inch and about .200 inch in width. Using the narrow edges of the saw, the kerf of a diamond saw is only about one-half the width of the kerf of an ordinary steel toothed saw. This item is important in cutting expensive materials such as tungsten carbide, gems, and the like where the loss of material in the kerf is significant.

The diamond coated band saw of my invention may be used for cutting very hard materials such as crystalline alumina, tungsten carbide, and lignum-vitae, as well as glass fiber reinforced plastics, and other composite materials which are not otherwise satisfactorily cut.

I claim:

1. A band saw comprising a flat bendable strip having a layer of diamond grits embedded in an electroplated metal coating on said strip, said metal coating and said layer being attached to and extending over all of the lengthwise surfaces of said strip, said steel strip having short bare ends adapted for joining the strip by welding into a continuous band.

2. A band saw comprising a flat steel strip having a layer of diamond grits embedded in a metal coating on said strip, said metal coating and said layer extending over all of the lengthwise surfaces of said strip, the said layer of diamond grits being thicker adjacent the narrow edges of said strip, said steel strip having short bare ends for joining the strip into a continuous band; and a welded joint between the bare ends of said strip, said joint being built up to the thickness of the diamond grit coating by brazing on a coating of a copper alloy.

3. A band saw comprising a flat steel strip having a layer of diamond grits embedded in a metal coating on said strip, said metal coating and said layer extending over all of the surfaces of said strip, the said layer of diamond grits being thicker adjacent the narrow edges of said strip, said steel strip having short bare ends for joining the strip into a continuous band; and a welded joint between the bare ends of said strip.

4. A band saw comprising a flat steel strip having a layer of diamond grits embedded in a metal coating on said strip, said metal coating and said layer extending over all of the surfaces of said strip, the said layer of diamond grits being thicker adjacent the narrow edges of said strip, said steel strip having short bare ends for joining the strip into a continuous band; and a welded joint between the bare ends of said strip, said joint portion of said strip being built up to the thickness of the diamond grit coating.

5. A band saw comprising a flat steel strip having a layer of diamond grits embedded in a metal coating on said strip, said metal coating and said layer extending over all of the surfaces of said strip, the said layer of diamond grits being thicker adjacent the narrow edges of said strip, said steel strip having short bare ends for joining the strip into a continuous band; and a welded joint between the bare ends of said strip, said joint portion of said strip being provided with a filler of the thickness of the diamond grit coating adjacent said bare ends.

6. The method of forming a diamond coated band saw comprising the steps of supporting a flat strip of metal on one side on a wider non-conductive support immersed in a nickel plating bath; distributing diamond grits on the upper flat surface of said metal strip and over the thin edges of said strip while electrolytically plating out nickel on said strip to form an embedding layer of nickel over said exposed strip and its edges and the diamond grits distributed thereon; reversing said strip on said support to expose the other flat side; distributing diamond grits on said other flat side of said strip and over the thin edges of said strip; and continuing electroplating of an embedding layer of nickel over said exposed other side of said strip and its edges upon which the diamond grits have been distributed.

7. The method of forming a diamond coated band saw comprising the steps of supporting a flat strip of metal on one side on a wider non-conductive support immersed in a nickel plating bath; distributing diamond grits on the upper flat surface of said metal strip and over the thin edges of said strip while electrolytically plating out nickel on said strip to form an embedding layer of nickel over said exposed strip and its edges and the diamond grits distributed thereon; reversing said strip on said support to expose the other flat side; distributing diamond grits on said other flat side of said strip and over the thin edges of said strip; continuing electroplating of an embedding layer of nickel over said exposed other side of said strip and its edges upon which the diamond grits have been distributed; forming said strip into an endless saw by a butt welded joint joining the ends thereof; and filling in the depressed areas over said welded joint by brazing thereon a metal to the approximate thickness of the diamond coating on the other portions of said strip.

8. The method of forming a diamond coated band saw comprising the steps of electroplating a flat strip of steel with a thin coating of nickel; supporting said flat strip on one side on a wider nonconductive support immersed in a nickel plating bath; distributing diamond grits on the upper flat surface of said metal strip and over the thin edges of said strip while continuing the electrolytic plating of nickel; electroplating an embedding layer of nickel over said exposed strip and its edges upon which diamond grits have been distributed; reversing said strip on said support to expose the other flat side; distributing diamond grits on said other flat side of said strip and over the thin edges of said strip; electroplating an embedding layer of nickel over said exposed other side of said strip and its edges upon which the diamond grits have been distributed; forming said strip into an endless saw by a butt welded joint joining the ends thereof; and filling in the depressed areas over said joint by brazing thereon a copper alloy to the approximate thickness of the diamond coating on the other portions of said strip.

References Cited in the file of this patent

UNITED STATES PATENTS

| | | |
|---|---|---|
| 604,569 | Ringstrom | May 24, 1898 |
| 2,309,305 | Dahlstrom et al. | Jan. 26, 1943 |